Figure 1:
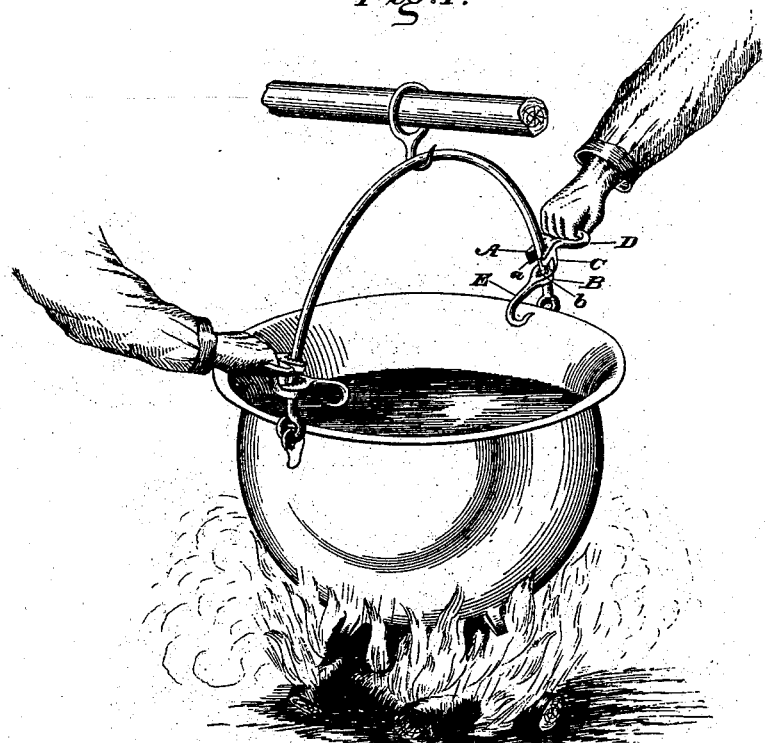

(No Model.)

I. B. KOONS.
KETTLE LIFTER.

No. 503,862. Patented Aug. 22, 1893.

Witnesses:
M. E. Fowler
A. E. Dowell

By his Attorney

Inventor:
Isaac B. Koons
G. T. Oplinger

UNITED STATES PATENT OFFICE.

ISAAC B. KOONS, OF FOGLESVILLE, PENNSYLVANIA.

KETTLE-LIFTER.

SPECIFICATION forming part of Letters Patent No. 503,862, dated August 22, 1893.

Application filed May 10, 1893. Serial No. 473,648. (No model.)

*To all whom it may concern:*

Be it known that I, ISAAC B. KOONS, a resident of Foglesville, Lehigh county, and State of Pennsylvania, United States of America, have invented certain new and useful Improvements in Kettle-Lifters; and I do hereby declare that the following is a full, clear, and exact description thereof, reference being had to the accompanying drawings, and to the letters of reference marked thereon, which form part of this specification.

This invention is a novel implement adapted for various purposes, but especially designed for use in lifting iron kettles such as are used in boiling maple sirup, fruit butters, soap, &c., and which on account of their large size are dangerous to handle in the ordinary ways. The implement may also be used as a pipe wrench, or a nut wrench, for small pipes and nuts, and as a bale hook, or meat hook, and in various ways is a handy article for farmers, merchants and others.

The invention consists in the novel construction of the implement, substantially as hereinafter described and illustrated in the drawings, in which—

Figure 2:
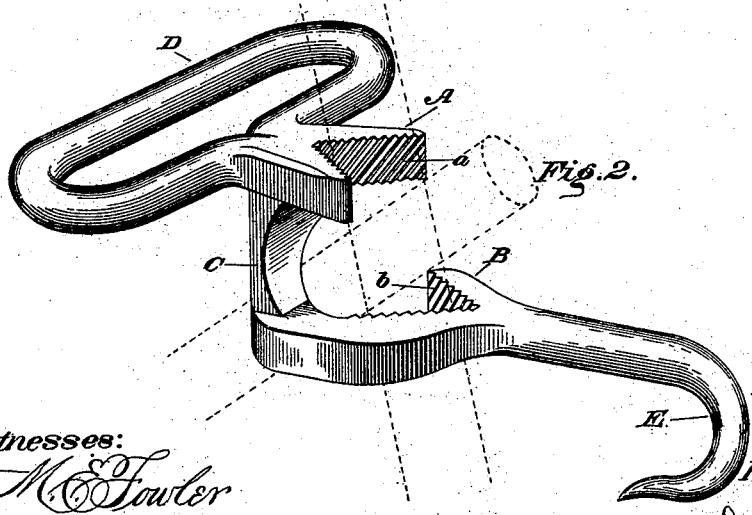

Figure 1 is a view illustrating the manner of using the implement. Fig. 2 is a perspective view of the implement alone.

The implement is formed with two horizontally disposed V-jaws A, B, which are arranged in different planes one above the other and open toward each other in opposite directions. The jaws are rigidly connected by a shank C, which as shown forms a continuation of one of the bifurcations of the lower jaw, and is rigidly connected to the tang of the upper jaw so that said jaws are immovable in relation to each other. Shank C is so bent that it will not obstruct the jaw B, and in clamping a rod or pot handle it is only necessary that the implement be inclined to the object or vice versa, as indicated in dotted lines Fig. 2, to enable the jaws to bite it properly. To the tang of the upper jaw A is rigidly connected a handle, preferably a loop handle D which lies at right angles to shank C as shown, and to the tang of the lower jaw B is connected a hook E as shown in the drawings.

The handle, jaws, shank and hook may all be formed in one piece if desired, and I contemplate so making the tool.

The inner faces of jaws A, B, may be diagonally serrated as at $a$, $b$, to cause them to bite and hold an object more securely.

To handle kettles the implement is used as indicated in Fig. 1, the bail of the kettle being grasped at each side by and between jaws A, B, and by pulling up on the handles the bail is gripped so tightly that the kettle may be lifted off the fire and carried where desired without danger to the person carrying it.

The utility of the implement is apparent from the foregoing, and it is useful in a variety of other ways for many purposes which it is needless to detail here.

Obviously the principal feature of the implement is the oppositely disposed rigidly connected jaws provided with a suitable handle for manipulating them, and the construction of the implement may be varied while retaining the essentials thereof.

Having described my invention, what I claim as new, and desire to secure by Letters Patent thereon, is—

1. A pot hook having two oppositely disposed, rigidly connected, inwardly opening jaws, and a handle, substantially as and for the purpose described.

2. An implement having two inwardly opening opposite jaws disposed in different planes, and rigidly connected together, and a handle, substantially as described.

3. An implement for the purpose specified, having two V-shaped jaws disposed in different planes and opening toward each other, rigidly connected together, and a handle connected to the upper jaw, substantially as and for the purpose described.

4. The herein described implement having jaws A, B, connected by shank C, a handle D attached to jaw A, and a hook E attached to jaw B, all constructed substantially as and for the purpose set forth.

In testimony that I claim the foregoing as my own I affix my signature in presence of two witnesses.

ISAAC B. KOONS.

Witnesses:
 WILLIAM M. SELL,
 MEDA SELL.